(12) United States Patent
Gillot

(10) Patent No.: US 8,460,727 B2
(45) Date of Patent: Jun. 11, 2013

(54) CHIA-BASED FATTY ACIDS FOOD PRODUCT, RICH IN OMEGA-3, WITH GOOD STABILITY

(76) Inventor: Sandra Gillot, Santiago (CL)

( * ) Notice: Subject to any disclaimer, the term of this patent is extended or adjusted under 35 U.S.C. 154(b) by 76 days.

(21) Appl. No.: 13/014,955

(22) Filed: Jan. 27, 2011

(65) Prior Publication Data

US 2011/0183033 A1   Jul. 28, 2011

Related U.S. Application Data

(63) Continuation of application No. PCT/EP2009/001626, filed on Mar. 6, 2009.

(30) Foreign Application Priority Data

Jul. 23, 2008   (CL) .................................. 2157-2008

(51) Int. Cl.
*A23L 1/00*   (2006.01)
(52) U.S. Cl.
USPC ........................................... 426/89; 426/471
(58) Field of Classification Search
USPC ........................................................ 426/89
See application file for complete search history.

(56) References Cited

U.S. PATENT DOCUMENTS

| | | | |
|---|---|---|---|
| 6,444,242 B1 | 9/2002 | Skelbaek et al. | |
| 2003/0175403 A1 | 9/2003 | Gurin | |
| 2006/0134180 A1 | 6/2006 | Valentinotti et al. | |

FOREIGN PATENT DOCUMENTS

| | | |
|---|---|---|
| CL | 02157-2008 | 2/2009 |
| CN | 1386497 A | 12/2002 |
| FR | 2 758 005 A1 | 7/1998 |
| WO | WO 94/01001 A1 | 1/1994 |
| WO | WO 2006/067647 A2 | 6/2006 |
| WO | WO 2010/012320 A1 | 2/2010 |

OTHER PUBLICATIONS

Igoe, Robert S.; Hui, Y. H. (2001). Dictionary of Food Ingredients (4th Edition). (pp. 14 and 47). Springer—Verlag.*
NSRI, Chia Seed—*Salvia hispanica* L. Technical Sheet, Nutritiona Science research Institute, Relevant date Apr. 11, 2005 Exhibit 2, total pp. 14.*
International Preliminary Report on Patentability (IPRP) dated Feb. 1, 2011 for corresponding PCT App. No. PCT/EP2009/001626 (Publication WO 2010/012320A1). (6 pages).
International Search Report (ISR) dated Aug. 5, 2009 for corresponding PCT App. No. PCT/EP2009/001626 (Publication WO 2010/012320A1). (5 pages).

* cited by examiner

*Primary Examiner* — Jyoti Chawla
(74) *Attorney, Agent, or Firm* — Hasse & Nesbitt LLC; Daniel F. Nesbitt

(57) ABSTRACT

A food product with Chia vegetable oil as a source of essential fatty acids, obtained by a simple and effective micro-encapsulation method using spray drying under special conditions. The product is highly soluble and oxidatively stable (by micro-encapsulation), odorless and flavorless, and can be used in food preparations or can be ingested alone.

13 Claims, 1 Drawing Sheet

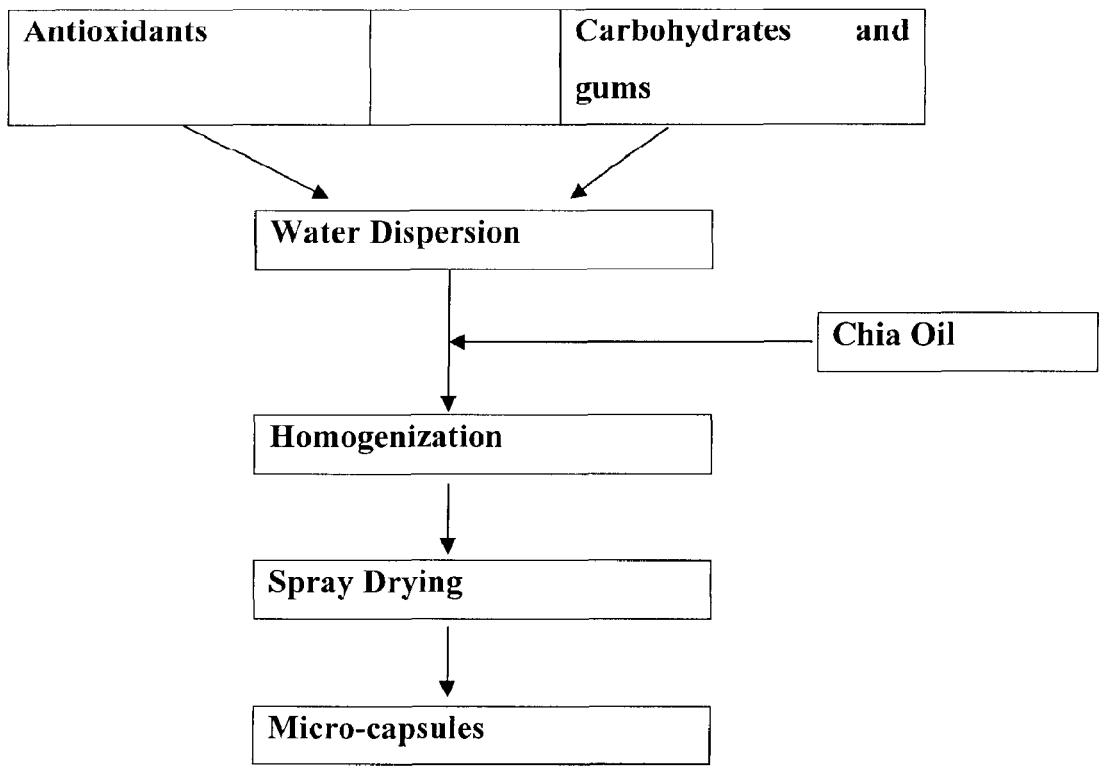

CHIA-BASED FATTY ACIDS FOOD PRODUCT, RICH IN OMEGA-3, WITH GOOD STABILITY

CROSS-REFERENCE TO RELATED APPLICATIONS

This application is a continuation application of pending PCT Application No. PCT/EP2009/001626, filed Mar. 6, 2009, the disclosure of which is incorporated by reference in its entirety, which claims the priority of Chilean Patent Application No. 2157-2008 filed on Jul. 23, 2008, which is incorporated herein by reference in its entirety.

BACKGROUND OF THE INVENTION

Fats are very useful for our bodies, as important deposits of energy reserves. For this reason they need to be present in the organism in adequate amounts.

In a healthy diet, approximately 30 percent of daily calories should come from fats. Vegetal-origin fats in oils and/or marine-origin fats in some fishes are recommended, as they protect the cardiovascular system.

The basic fat components are fatty acids. Among them there are varieties known as Omega-3, Omega-6, and Omega-9, important because the human body cannot produce them and they must therefore be ingested through adequate nutrition.

Scientific research has demonstrated that in geographical areas where these fatty acids are plentiful in the daily diet, the levels of atheroesclerosis and cardiovascular conditions are almost non-existent. Analyses of eating habits in these areas have led to the conclusion that the common elements in these regional diets—Omega fatty acids—are responsible for these virtues.

These fatty acids can lower cholesterol and triglycerides levels, while at the same time reducing the accumulation of plaque in the arteries. This implies that the platelets circulating in the blood stream do not stick to each other, thus preventing clot formation.

Among the many Omega-3 functions, its role in the formation of cell membrane must be highlighted; they make up most of the brain tissue since the nerve cells are rich in Omega-3 fatty acids; and they turn into prostaglandins, a substance that plays an important role in the regulation of the cardiovascular, immunological, digestive, and reproductive systems, in addition to anti-inflammatory effects.

The Omega-3 and Omega-6 fatty acids are found in high concentration in fish, and in smaller amounts in seeds and vegetable oils such as linseed, soy, corn and walnuts. Omega-3 is found in Chia oil ("Salvia Hispánica") in large amounts. Its consumption reduces cholesterol serum levels, TAG levels, ischemic damage following heart attacks and cerebral vascular accidents (CVA or strokes), by reducing blood viscosity and arterial blood pressure. To prevent this type of conditions, weekly consumption of 400 grams (two servings) of fish, or its equivalent in vegetal-origin Omega-3 fatty acids, is useful.

In summary, Omega-3 has been the subject of a great deal of research in the past few decades, and it has been stated that consumption of adequate amounts of Omega-3 fatty acids decreases the risk of cardiovascular and inflammatory diseases and is indispensable for the fetus neuronal and visual development.

Omega-3, while being very necessary in the human diet, is scarce and expensive. Currently, it is obtained from fishes such as salmon, tuna, codfish, mackerel, sardines, and from shellfish; also from some species of marine algae, from seeds such as Chia (Salvia Hispánica) and linseed. Ingestion of Omega-3 is also associated to cultural factors that influence the types of preferred foods of the various human groups.

It should be noted that modern occidental cultures tend to include very few of these foods in their diets. For this reason, the enrichment of food elements with Omega-3 fatty acids is becoming a necessity in many countries which consider important the role of essential fatty acids for public health, thus ensuring that their population is able to permanently consume the amounts required to meet their daily needs.

Vegetarians or people who cannot or do not like to eat fish can ingest equivalent quantities of vegetal origin Omega-3 fatty acids.

SUMMARY OF THE INVENTION

This present invention provides a powdered food supplement with one of the largest Omega-3 (Alpha-Linolenic) fatty acid contents currently found in the market. This product is different from other current ones in that it is highly soluble and oxidatively stable (by micro-encapsulation), it is odorless and flavorless, and can therefore be used by the food industry in food preparations or can be ingested alone. It is the only food product with Chia vegetable oil as a source of essential fatty acids. Furthermore, a new simple and effective micro-encapsulation method has been developed for this product, using spray drying under special conditions.

Micro-Encapsulation

Micro-encapsulation can be considered a special form of packing, in which a particular substance is individually covered to protect it from the environment and from deleterious influences. In an ample sense, micro-encapsulation provides a means to pack, separate and store materials at microscopic scale, for their subsequent release under controlled conditions.

Nowadays micro-encapsulation is applied to preserve and/or protect numerous commercial ingredients, including vegetable oils.

The covered material is referred to as the internal phase and the covering material is called wall, and it typically shows no reaction with the material to encapsulate.

There are numerous techniques for preparing microcapsules. Several authors have suggested that more than 200 methods could be identified in the patent literature. Encapsulating methods have been classified as "Chemical" and "Physical" (or Mechanical).

A. The following are cited as Chemical methods:
1. Complex coacervation,
2. Interfacial polymerization,
3. Ionic gelation,
4. Polymeric incompatibility, and
5. Liposome trapping.

B. —Among the Physical (or Mechanical) methods the most common are:
1. Spray Drying, and
2. Fluid-bed encapsulating.

The method selection will depend on the properties of the material to be encapsulated, on the desired microcapsule size, on the application and on the release mechanisms.

Spray Drying

Spray drying is a dehydration process by itself; however in this invention it is used for direct encapsulation, since the dryer first atomizes the material in order to produce material micro-particles, and also, during the drying process, due to the high temperature employed in this invention, forms the external film.

FIGURE DESCRIPTION OF THE FIGURE

FIG. 1 shows the production process, as an illustrative (but not limiting) example.

The process consists of three stages, namely, Water Dispersion, Homogenization, and Spray Drying.

The upper part of the figure shows the water dispersion preparation of the antioxidants (ascorbyl palmitate, alpha tocopherol, dipotassic phosphate) on one side, and Carbohydrates and Gum (modified starch, Arabic gum and maltodextrine) on the other. The upper box shows the values of the variables involved in the Water Dispersion stage.

The central part of the figure shows the addition of the Chia Oil and the dispersion homogenization.

The lower part of the figure shows the important Spray Drying stage. This stage will generate the micro-capsules enclosing the Omega-3 and covering it with a carbohydrate layer, which will be important in protecting the Omega-3 over time, and will facilitate its incorporation into other industrial or domestic food preparations.

The lower part shows the values of the variables involved in the drying-encapsulating stage.

DETAILED DESCRIPTION OF THE INVENTION

Problem to be Solved

This invention attempts to solve the issue brought about by the scarcity of Omega-3 in the occidental diet through a product with an extremely high content of Omega-3, that may be used to improve the diet of many people through a renewable and cheap source of vegetal origin (acceptable for vegetarians, contrary to fish oils), namely, Chia oil.

This invention includes the development of a new food product based on fatty acids from Chia seeds, extremely rich in Omega-3, oxidatively stable, odorless and flavorless; its use in the food industry, its formulation, manufacturing process and use.

This compound will be the only Omega-3 compound produced from Chia Oil and will have the highest Omega-3 fatty acid content currently on the market. It will be highly soluble and oxidatively stable, odorless and flavorless, to be used in the food industry, either as an ingredient or alone. Although Chia oil is at present quite scarce, its production could be increased as required, since there are no production limitations given that it is a renewable good.

Chia Oil and Considerations for this Invention:

Chia oil has a considerable amount of Omega-3 fatty acids (>60%), far larger than other plant products, such as Rapeseed (Canola), Soy, Corn, and Linseed, which normally contain around 10%. In spite of this huge difference in Chia's favor, however, there is currently no food product or supplement containing Omega-3 fatty acids available, which source is Chia seed or oil.

The oxidative stability of Chia oil has been studied and improved for this invention, as well as the feasibility of its incorporation into the food industry.

The fat condition of Chia oil prevented its use in many food preparations, particularly those with larger water content or requiring to be reconstituted in water.

Furthermore, the high content of long chain fatty acids makes it more susceptible to oxidation and to rapid reaction when exposed to industrial manipulation.

Micro-encapsulation was used to improve the incorporation of the oil into liquid food preparations and to protect its Omega-3 fatty acid content from degrading agents. A powdered product, consisting of micro-drops covered by a carbohydrate matrix, was obtained.

The carbohydrate matrix provides a barrier against external agents such as oxygen, UV light, temperature and humidity, facilitating its application as Omega-3 dietary supplement in a large variety of food products.

Although there are many other micro-encapsulation techniques, this invention uses a new technique, especially developed for this application, simpler and yet just as effective as the best known techniques.

Micro-Encapsulation of Chia Oil

The micro-encapsulation process, basically similar to all others, differs technically from the one applied to other plant oils, since the processing conditions, such as temperature and time, are defined by the raw materials.

Basically, the main difference is in the formula. After selecting the adequate method and adjusting its technical conditions, the Chia oil must be prepared for encapsulation, since given its unique characteristics of high polyunsaturated fatty acid content, it is highly susceptible to oxidation. This does not happen with other more stable vegetable oils due to their composition.

With this objective, the oxidative stability of Chia oil was studied in depth to determine the conditions that affect its oxidation. After these factors have been identified, the type and amount of antioxidants to be added to the formula to increase the product's shelf life was determined.

In a study conducted by the inventor jointly with the Universidad de Chile Laboratory to justify the addition of antioxidants, it was noticed that by adding tocopherols, the mixture presented a good induction time at 100° C. (over 4 hours); however, when adding ascorbyl palmitate, the increase in the induction time was very significant (more than 10 hours). This translates into greater oxidative stability and longer shelf life. For this reason, it was decided to use both tocopherols and palmitate. In this same study, furthermore, an analysis was conducted on the amount of antioxidants necessary to warrant the oxidative stability of the mixture.

The third step to achieve an adequate encapsulation was the selection of the most adequate encapsulation matrix. Maltodextrines and starches were used in combination with arabic gum to help with the structural continuity during the formation of the encapsulating film, by combining two compounds with very different molecular weight (approximately 1,800 and 1,700,000 respectively), thereby improving the efficiency of the oil encapsulation.

Arabic gum was used, as it has been recently demonstrated that the interaction between arabic gum and lipids prevents oxidation. The proposed mechanism is related to the arabic gum propertied absorbed during the oil/water interface, forming a viscoelastic film, where lipids contribute to the structure coherency by forming joints or unions by means of tiny oil drops in the arabic gum chain anchoring.

The right selection of the type and operating conditions, of the atomizer and encapsulating agent, are critical factors. One of the big advantages of this process, in addition to its simplicity, is its adequacy for heat-sensitive materials, since the exposition time to high temperatures is very short (5 to 30 seconds), therefore it is ideal for chia oil, given that its high content of polyunsaturated fatty acids makes it very sensitive to high temperatures.

Process Description

The process consists in preparing and homogenizing dispersion with the ingredients, as described below, and then producing the Micro-capsules through Spray Drying of the Homogenized Dispersion.

Spray drying is in itself a dehydration process, but it is also an encapsulation process since it can produce particles that 'trap' the material. By definition, it is the transformation of a fluid into a solid material, atomizing it into minuscule drops in a heat-drying environment.

The process begins with hydration of the anti-oxidants (ascorbyl palmitate, alpha tocopherol, dipotassic phosphate) in hot water (40 and 60° C.); then the Carbohydrates and the Gum (modified starch, Arabic gum and maltodextrine). It is then shaken for 4 to 6 minutes. The Chia oil is added and the mixture is shaken for 8 to 12 more minutes. The temperature, time, and mixing order were determined by first studying the optimum temperature that would not promote oxidation of the fatty acids; secondly, by determining the minimum exposure time of the compounds to that temperature and, finally, by studying the solubility and molecular weight of each compound.

The process continues with the Homogenization of the recently prepared suspension and the conditioning of its parameters.

The process ends with spray drying under computer-determined conditions, in accordance to the physical Suspension characteristics.

Example Of Product Manufacturing

One of the ways to prepare the product is as follows, without this implying any limitation:

Take half kilogram of ascorbyl palmitate, 2 kilograms of alpha-tocopherol, 14 kilograms of dipotassic phosphate and disperse in 1000 liters of water at 50° C. To this dispersion, add 285 kilograms of modified starch, 95 kilograms of Arabic gum and 173 kilograms of maltodextrine. The mixture is then shaken for 5 minutes. Add 500 liters of Chia oil and shake for 10 more minutes. The dispersion is then homogenized (and heated at 200° C.) to feed the spray dryer which is at a −15 mm. Ca depression. Its atomizer is adjusted to 50 Hz frequency and at 17,625 RPM.

The 100 micrograms microcapsules come out at 115° C., with 3.5% moisture content, 53.9% fat content and 35.2% of dry matter.

The food product contains 8% to 98%, more typically 8% to 70% of Omega-3 from Chia Oil.

Typical Formula (not Limiting)

| INGREDIENT | PERCENTAGE |
| --- | --- |
| Deodorized Chia Oil | 10-50 |
| Dipotassic Phosphate | 0.5-2 |
| Ascorbyl Palmitate | 0.05-0.2 |
| Alpha Tocopherol (500 UI) | 0.1-0.2 |
| Modified starch | 25-35 |
| Maltodextrine | 15-20 |
| Arabic Gum | 5-15 |

Antioxidants were added to prevent oil's oxidation, and therefore to increase its shelf life.

The use of both tocopherols and palmitate was decided for this reason. Moreover, in this same study an analysis was conducted on the amount of required antioxidants to warrant the mixture's oxidative stability. The maltodextrines and starches were used in combination with arabic gum to help in the structural continuity during development of the encapsulating film, by combining two compounds with very different molecular weight, thereby improving the efficiency of the oil encapsulation.

Characterization Of The Example End Product:

| A. Physical Characteristics | |
| --- | --- |
| Moisture (%) | Less than 4 |
| Particle size (ug) | 10-100 |
| Peroxide index (meq/Kg.) | Less than 5 |
| Dry Matter (%) | Greater than 30 |
| Fat Content (%) | 15-60 |

| B. Profile of fatty acids |
| --- |
| Saturated Fatty acids (%) 0.5-12 |
| Monounsaturated Fatty acids (%) 3.5-8.0 |
| Polyunsaturated Fatty acids (%) 8.0-93 |
| Alpha-Linolenic (%) 6.0-70 |
| Linoleic (%) 2.0-23 |

The invention claimed is:

1. A food product comprising polyunsaturated Omega-3 fatty acids, in the form of micro-capsules consisting of a micro-capsule wall encapsulating a formula, the formula comprising, by weight of the food product:
    10% - 50% Chia Oil, the Chia Oil comprising 8% to 98% Omega-3 fatty acids;
    less than 4% moisture;
    0.5 to 2% dipotassic phosphate;
    0.05 to 0.2% ascorbyl palmitate; and
    0.1 to 0.2% alpha-tocopherol;
wherein the encapsulating wall comprises, by weight of the food product:
    25 to 35% modified starch;
    15 to 20% maltodextrine, and
    5 to 15% arabic gum;
and wherein the food product comprises less than 5 milliequivalents per kilogram of peroxide index, over 30% of dry matter, and 15 to 60% of fat content.

2. The food product according to claim 1, wherein the maltodextrine has a molecular weight of approximately 1,800 and the modified starch has a molecular weight of approximately 1,700,000.

3. The food product according to claim 2 wherein the micro-capsules have a particle size of 10 to 100 microns.

4. The food product according to claim 2 wherein the Chia oil contains 8% to 70% Omega-3.

5. The food product according to claim 4 wherein the micro-capsules have a particle size of 10 to 100 microns.

6. The food product according to claim 1 wherein the Chia oil contains 8% to 70% Omega-3.

7. The food product according to claim 6 wherein the micro-capsules have a particle size of 10 to 100 microns.

8. The food product according to claim 1 wherein the micro-capsules have a particle size of 10 to 100 microns.

9. A process for making the food product according to claim 1, consisting the steps of:
    a. forming a dispersion in water of the Chia oil, the dipotassic phosphate, the ascorbyl palmitate, the alpha tocopherol, the modified starch, the maltodextrine, and the arabic gum;
    b. homogenizing the water dispersion, and c. spray drying the homogenized dispersion to form the micro-capsules containing Omega-3 fatty acids.

10. The process according to claim 9 wherein the spray drying includes an entry temperature of 150 to 230 ° C., an exit temperature of 95 to 115 ° C., and atomizer frequency of 50 Hz.

11. The process according to claim 9, wherein the ascorbyl palmitate, alpha tocopherol, and dipotassic phosphate are first hydrated in water at 40 to 60° C.; and then, the modified starch, arabic gum, and maltodextrine are added.

12. The process according to claim 9 wherein the step of forming the dispersion comprises shaking a mixture in water of the dipotassic phosphate, the ascorbyl palmitate, the alpha tocopherol, the modified starch, the maltodextrine, and the arabic gum for a few minutes, adding the Chia oil, and then shaking for a few more minutes until a viscous suspension is obtained.

13. The process according to claim 9 wherein the spray drying is conducted in a spray dryer chamber at a 1 millimeter typical depression of Water Column, and the atomizing is conducted in an atomizer typically rotating at 17,625 revolutions per minute.

\* \* \* \* \*